(12) United States Patent
Une et al.

(10) Patent No.: US 7,009,639 B1
(45) Date of Patent: Mar. 7, 2006

(54) COLOR IMAGING BY INDEPENDENTLY CONTROLLING GAINS OF EACH OF R, GR, GB, AND B SIGNALS

(75) Inventors: Hideho Une, Tokyo (JP); Noriko Chino, Kanagawa (JP)

(73) Assignee: Sony Corporation, Tokyo (JP)

( * ) Notice: Subject to any disclaimer, the term of this patent is extended or adjusted under 35 U.S.C. 154(b) by 808 days.

(21) Appl. No.: 09/583,375

(22) Filed: May 30, 2000

(30) Foreign Application Priority Data

May 31, 1999 (JP) ............................... P11-152934

(51) Int. Cl.
*H04N 9/73* (2006.01)
(52) U.S. Cl. ................................ 348/223.1; 348/229.1
(58) Field of Classification Search ............ 348/223.1, 348/222.1, 280, 273, 234, 237
See application file for complete search history.

(56) References Cited

U.S. PATENT DOCUMENTS 5,223,921 A * 6/1993 Haruki et al. ............... 348/655
5,737,017 A * 4/1998 Udagawa et al. ........... 348/280
5,912,703 A * 6/1999 Tamayama .................. 348/241
6,366,318 B1 * 4/2002 Smith et al. ................ 348/272
6,573,935 B1 * 6/2003 Yamada ...................... 348/272
6,597,395 B1 * 7/2003 Kim et al. ................ 348/222.1
6,642,957 B1 * 11/2003 Taura ....................... 348/223.1
6,657,659 B1 * 12/2003 Van Rooy et al. ........ 348/226.1

* cited by examiner

*Primary Examiner*—David L. Ometz
*Assistant Examiner*—Yogesh Aggarwal
(74) *Attorney, Agent, or Firm*—Frommer Lawrence & Haug LLP; William S. Frommer; Samuel S. Lee

(57) ABSTRACT

To eliminate an amplitude difference between luminance signals from pixels included in horizontal lines of color filters, caused by a sensitivity difference from one photosensor to another in a CCD, and reduce a horizontal stripe-like noise appearing in a monitoring image and captured image, there is provided an arithmetic circuit to calculate an amplitude difference in Gr and Gb signals based on an output from a four-channel detector to set gains multiplied by compensation factors, respectively, with which the white balance-processed Gr and Gb signals are equal in amplitude to each other, thereby controlling the gain of a while balance amplifier.

10 Claims, 8 Drawing Sheets

COLOR IMAGING BY INDEPENDENTLY CONTROLLING GAINS OF EACH OF R, GR, GB, AND B SIGNALS

BACKGROUND OF THE INVENTION

1. Field of the Invention

The present invention relates to a single-chip color imaging apparatus and method.

2. Description of the Related Art

In the conventional single-chip color imaging apparatus using a CCD (charge-coupled device) or the like as a solid-state image sensor, filters for three primary colors R (red), G (green) and B (blue), respectively, are disposed in a positions corresponding to pixels of the CCD. In this color imaging apparatus, a luminance signal is produced based on a light incident upon the CCD, and color signals are produced correspondingly to the light incident upon the CCD through the three primary color filters. Namely, R, G and B color signals are produced correspondingly to a light incident upon the CCD pixels on which the three primary color filters are disposed.

In the CCD used in the color imaging apparatus, R, G and B color filters are provided for pixels, respectively, and disposed horizontally in a sequence of R, G, R, G, . . . , R and G, for example. Color signals are produced correspondingly to the three primary color filters on the pixels. Therefore, in such a CCD, a G color signal will not be produced from a pixel on which an R color filter is provided and it should be produced by interpolation of color signals.

That is, for a horizontal interpolation of color signals from pixels to acquire an interpolated image, color signals from pixels disposed successively in the horizontal direction are added together and averaged. Similarly, for a vertical interpolation, color signals from pixels disposed successively in the vertical direction are added together and averaged. For acquisition of a G color signal from a CCD pixel on which the R color filter is disposed, the above-mentioned interpolation is effected. For produce a pixel data through an interpolation, values indicative of vertical and horizontal correlations are detected. For this detection, signals from pixels surrounding the pixel in consideration are filtered for calculation. Further in this color imaging apparatus, interpolated pixel data acquired by interpolation are weighted by the correlation values.

However, since the photosensors for pixels in the CCD are different in sensitivity from each other, there will exist a difference in amplitude between a G signal from a G pixel included in a horizontal line of R, G, R, G, . . . , R and G color filters and a G signal from a G pixel included in a horizontal line of G, B, G, B, . . . , G and B color filters. Therefore, in a single-chip color imaging apparatus, when a luminance signal is produced from color signals from pixels in each horizontal line, the above difference in sensitivity from one photosensor to the other will cause a difference in amplitude between luminance signals from the pixels in different horizontal lines and it will appear as a horizontal stripe-like noise in a monitoring image and captured image.

OBJECT AND SUMMARY OF THE INVENTION

It is therefore an object of the present invention to overcome the above-mentioned drawbacks of the prior art by providing a single-chip solid-state color imaging apparatus and method adapted such that no amplitude difference caused by the sensitivity difference will exist between luminance signals from pixels included in horizontal lines and thus the horizontal stripe-like noise appearing in a monitoring image and captured image will be reduced.

According to the present invention, there is provided a color imaging apparatus including:

a solid-state image sensor having photosensors color-coded with three primary color filters formed like a matrix correspondingly to pixels of the solid-state image sensor, to provide three primary color signals acquired as captured image signals;

a four-channel signal detecting means for detecting, from the three primary color signals provided from the solid-state image sensor, an R signal acquired from R pixels in a horizontal line of R, G, R, G, . . . , R and G color filters, a Gr signal acquired from the G pixels in the same horizontal line, a Gb signal acquired from G pixels in a horizontal line of G, B, G, B, . . . , G and B color filters, and a B signal acquired from the B pixels in the same horizontal line;

a four-channel variable-gain amplifying means whose channels are controllable in gain independently of each other to amplify the R, Gr, Gb and B signals; and a gain controlling means for controlling, based on an output from the signal detecting means, the gain of each channel of the variable-gain amplifying means so that the R, Gr, Gb and B signals amplified by the variable-gain amplifying means are equal in level to one another for an achromatic color image.

According to the present invention, there is also provided a color imaging method including the steps of:

detecting, from the three primary color signals provided from the solid-state image sensor having photosensors color-coded with three primary color filters formed like a matrix correspondingly to pixels of the solid-state image sensor, an R signal acquired from R pixels in a horizontal line of R, G, R, G, . . . , R and G color filters, a Gr signal acquired from the G pixels in the same horizontal line, a Gb signal acquired from G pixels in a horizontal line of G, B, G, B, . . . , G and B color filters, and a B signal acquired from the B pixels in the same horizontal line;

amplifying the R, Gr, Gb and B signals by a four-channel variable-gain amplifying means whose channels are controllable in gain independently of each other; and controlling, by a gain controlling means, based on an output from the signal detecting means, the gain of each channel of the variable-gain amplifying means so that the R, Gr, Gb and B signals amplified by the variable-gain amplifying means are equal in level to one another for an achromatic color image.

According to the present invention, an output from a detecting means used typically in this field of art is used to calculate an amplitude difference between the Gr and Gb signals and set gains multiplied by compensation factors, respectively, with which the Gr and Gb signals after subjected to white balance processing will have an equal amplitude, thereby permitting to eliminate a horizontal stripe in a monitoring image and reduce a compression noise in a still image during image capturing. This can be attained only by modifying the internal configuration of a CPU, without any change of the conventional system and with no costs.

Also, with the present invention, it is possible to eliminate an amplitude difference between luminance signals from the pixels in the horizontal lines of color filters, which would be caused by the difference in sensitivity from one photosensor to another in the solid-state image sensor.

Therefore, according to the present invention, there is provided a single-chip solid-state color imaging apparatus and method in which the horizontal stripe-like noise appearing in a monitoring image and captured image can be reduced.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
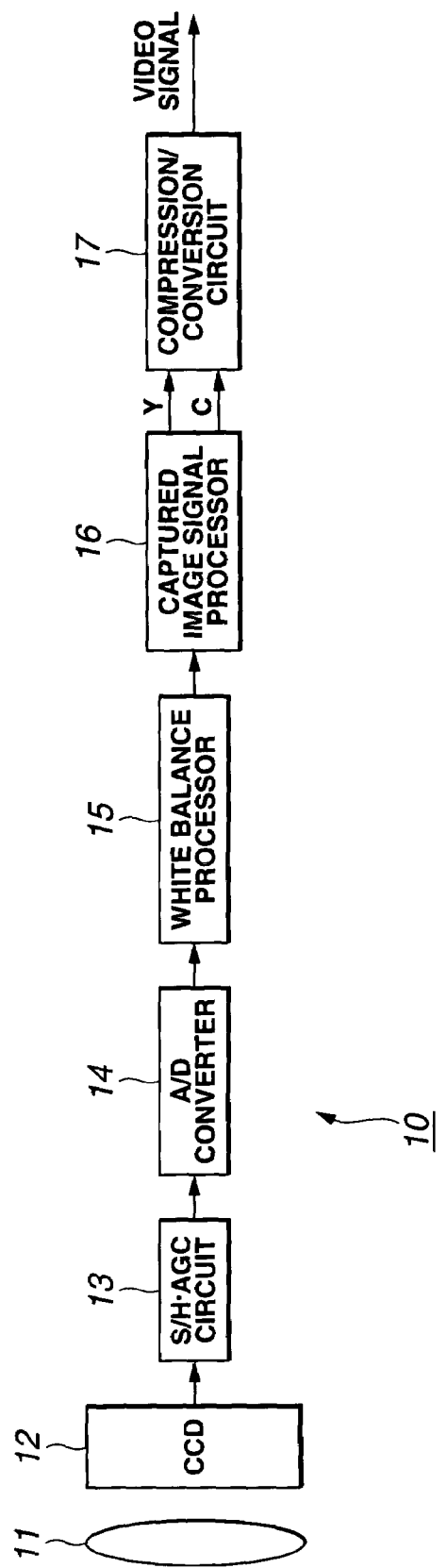
FIG. 1 is a block circuit diagram of the solid-state color imaging apparatus according to the present invention.

Referring now to FIG. 1, there is illustrated in the form of a block circuit diagram the solid-state color imaging apparatus according to the present invention. The solid-state color imaging apparatus is generally indicated with a reference 10.

The solid-state color imaging apparatus 10 is a single-chip solid-state color imaging apparatus including an imaging optical system 11, a CCD (Charge Coupled Device) 12 having an image sensing layer on which an image of an object is formed by the imaging optical system 11, an S/H•AGC circuit 13, an A/D converter 14 supplied with a captured image signal taken from the CCD 12 via the S/H•AGC circuit 13, a white balance processor 15 supplied with a digital captured image signal from the A/D converter 14, a captured image signal processor 16 supplied with the captured image signal adjusted in white balance by the white balance processor 15, and a compression/conversion circuit 17 supplied with a luminance signal Y and chrominance signals Cr and Cb generated by the captured image signal processor 16.

Figure 2:
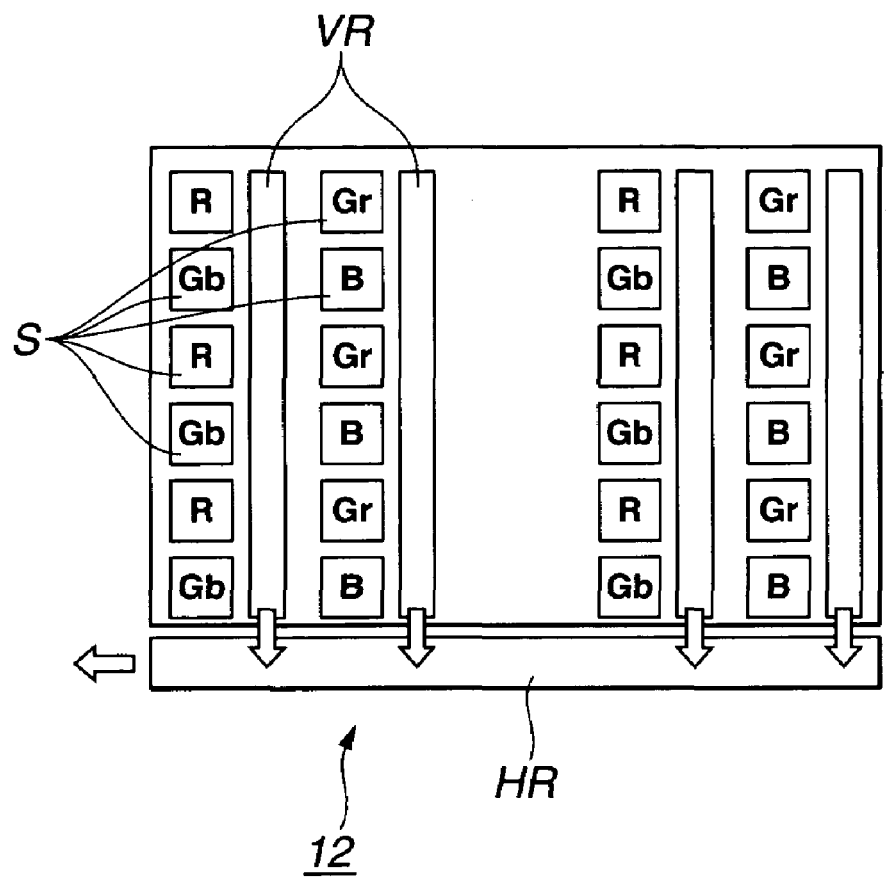
FIG. 2 is a schematic diagram of the CCD incorporated in the solid-state color imaging apparatus.

As schematically illustrated in FIG. 2, the CCD 12 is an interline transfer type CCD including a plurality of photosensors S for pixels arranged in the form of a matrix, a vertical transfer register VR disposed along each vertical line extending along one side of each trains of photosensors S, and a horizontal transfer register HR disposed along a line connecting the ends of the vertical transfer registers VR. This CCD is coded in color with filters of three primary colors formed from areas penneable to R (red) color light, areas penneable to G (green) color light, and areas penneable to B (blue) color light and arranged in the form of a matrix correspondingly to the photosensors S, that is, pixels. In the filters of three primary colors, areas permeable to rays of color light are disposed horizontally in a sequence of R, G, R, G, . . . , R and G or G, B, G, B, . . . , G and B, and there are alternately disposed horizontal lines along each of which R, G, R, G, . . . , R and G color filters are disposed (will be referred to as "RG line" hereinafter) and horizontal lines along each of which G, B, G, B, . . . , G and B color filters are disposed (will be referred to as "GB line" hereinafter). Pixels corresponding to photosensors color-coded with the three primary color filters, respectively, will be referred to as R, G and B pixels in the context of the color coding, and in order to provide a distinction between G pixels included in the RG and GB lines, respectively, the G pixel in the RG line will be referred to as Gr pixel while the G pixel in the GB line will be referred to as Gb pixel, hereinafter.

In the CCD 12, a capturing charge provided from each photosensor S correspondingly to an amount of incident light upon the photosensor via the imaging optical system 11 is transferred to the vertical transfer register VR for each vertical line, and read from each vertical transfer register VR via the horizontal transfer register HR for a horizontal line at each time.

Figure 3:
FIG. 3 shows a data list of captured image signals from the CCD.

The S/H•AGC circuit 13 samples and holds for each pixel the capturing charge read from the CCD 12 line-sequentially and adjusts the gains, and supplies the capturing charge as a capturing signal line-sequentially to the A/D converter 14 as shown in FIG. 3.

The A/D converter 14 digitizes pixel by pixel, namely, spot by spot, the next capturing signal in the order of the lines and supplies it to the while balance processor 15.

Figure 4:
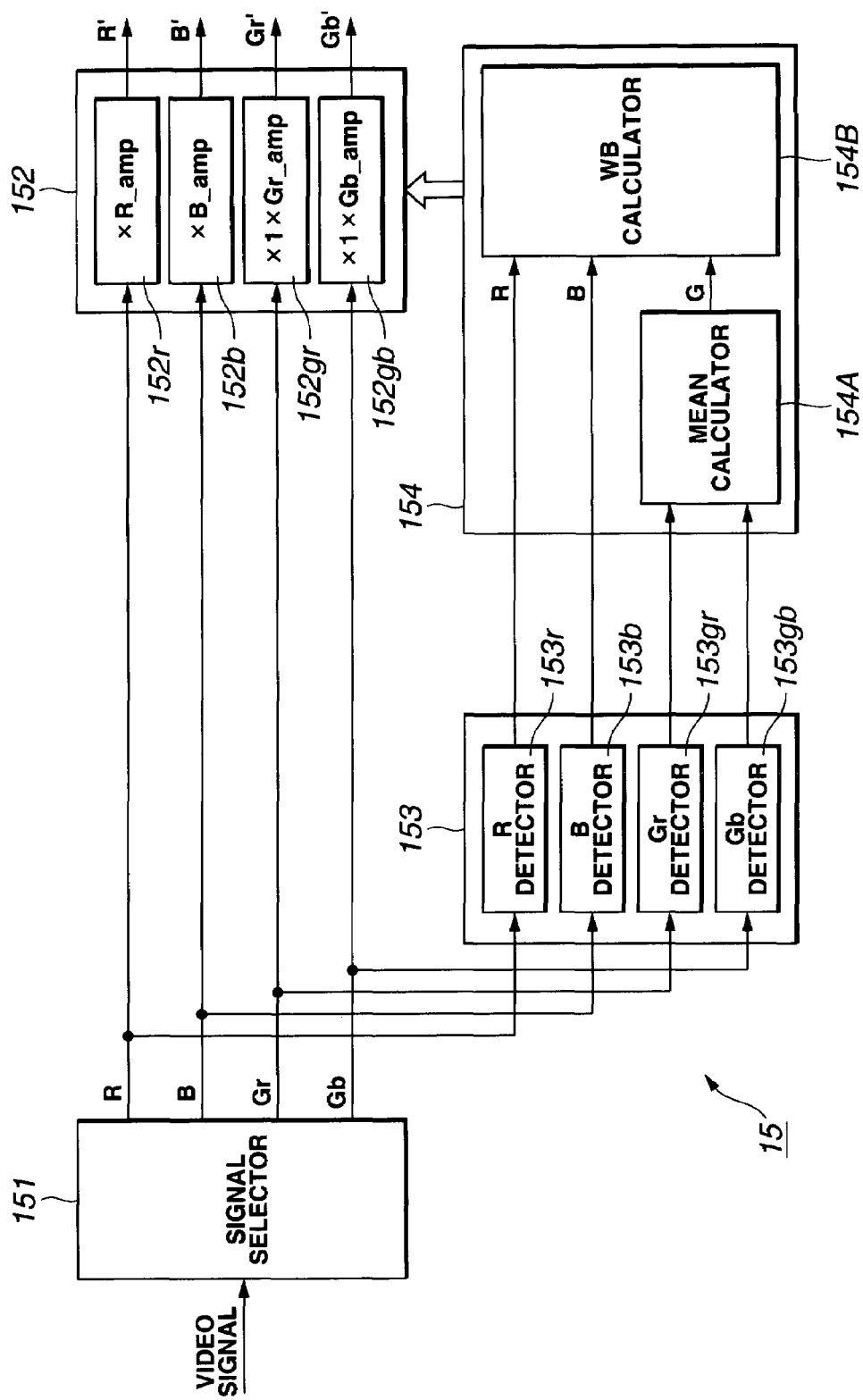
FIG. 4 is a block diagram of the white balance processor incorporated in the solid-state color imaging apparatus.

As shown in FIG. 4, the white balance processor 15 includes a signal selector 151 to extract captured image signals in the order of spots, digitized by the A/D converter 14 as the R, B, Gr and Gb signals, a WB (white balance) amplifier 152 and WB detector 153, supplied with the R, B, Gr and Gb signals extracted by the signal selector 151, and an arithmetic circuit 154 supplied with an output from the WB detector 153.

The WB amplifier 152 is a four-channel amplifier consisting of a variable-gain amplifier 152r for the R signal, variable-gain amplifier 152b for the B signal, variable-gain amplifier 152gr for the Gr signal, and a variable-gain amplifier 152gb for the Gb signal. The gains Rgain, Bgain, Grgain and Gbgain of the variable-gain amplifiers 152r, 152b, 152gr and 152gb are controlled independently by the arithmetic circuit 154.

The WB detector 153 is a four-channel detector consisting of a detector 153r for the R signal, detector 153b for the B signal, detector 153gr for the Gr signal, and a detector 153gb for the Gb signal. Outputs from these detectors 153r, 153b, 153gr and 153gb are supplied to the arithmetic circuit 154.

The arithmetic circuit 154 includes a mean calculator 154A supplied with the outputs from the detectors 153gr and 153gb of the WB detector 153, and a WB calculator 154B supplied from the outputs from the detectors 153r and 153b of the WB detector 153 and from the output of mean calculator 154A. The arithmetic circuit 154 is formed from a CPU (central processing unit).

The arithmetic circuit 154 determines the gains Rgain, Bgain, Grgain and Gbgain of the variable-gain amplifiers 152r, 152b, 152gr and 152gb of the WB amplifier 152 so that the R, B, Gr and Gb signals extracted by the signal selector 151 are equal in level to one another for an achromatic color image. More particularly, the mean calculator 154A is used to average, for levels R, B, Gr and Gb of the R, B, Gr and Gb signals, the levels Gr and Gb of the Gr and Gb signals among the R, B, Gr and Gb signals supplied to the variable-gain amplifiers 152r, 152b, 152gr and 152gb, respectively, and a white balance is attained by controlling values R_amp, B_amp, Gr_amp and Gb_amp of the gains Rgain, Bgain, Grgain and Gbgain of the variable-gain amplifiers 152r, 152b, 152gr and 152gb by means of the WB calculator 154B so that the variable-gain amplifiers 152r, 152b, 152gr and 152gb will provide R, B, Gr and Gb signal outputs having the following signal levels R', B', Gr' and Gb', respectively.

R'=R×R_amp
B'=B×B_amp
Gr'=Gr×Gr_amp=Gr×1×Grcomp
Gb'=Gb×Gb_amp=Gb×1×Gbcomp where Grcomp and Gbcomp are set to have a value of Grcomp+Gbcomp=2.

Figure 5:
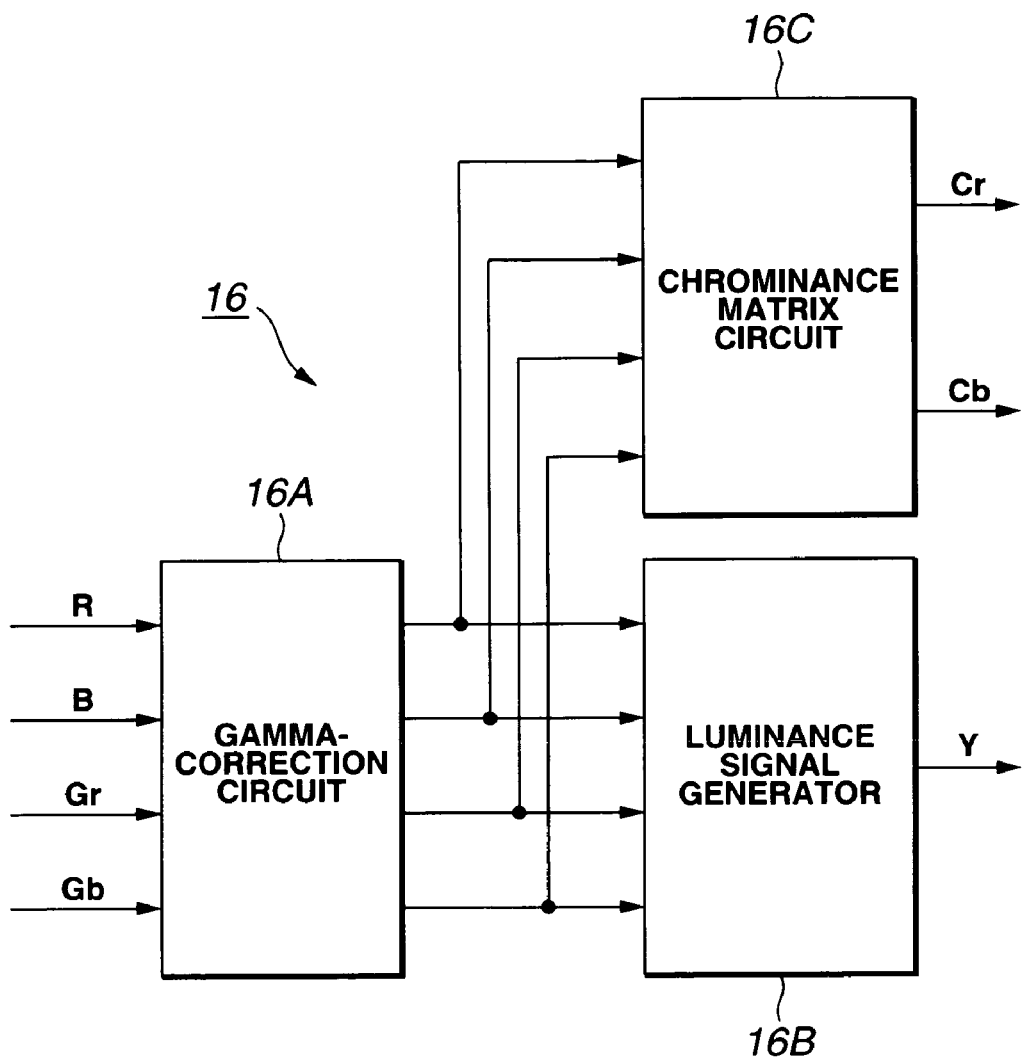
FIG. 5 is a block diagram of the captured image signal processor incorporated in the solid-state imaging apparatus.

As shown in FIG. 5, the captured image signal processor 16 includes a gamma-correction circuit 16A supplied with the R, B, Gr and Gb signals adjusted in white balance by the white balance processor 15, and a luminance signal generator 16B supplied with the R, B, Gr and Gb signals gamma-corrected by the gamma-correction circuit 16A, and chrominance matrix circuit 16C.

In the captured image signal processor 16, the R, B, Gr and Gb signals adjusted in white balance by the white balance processor 15 are gamma-corrected by the gamma-correction circuit 16A, and a luminance signal Y and chrominance signals Cr and Cb are produced from the gamma-corrected R, B, Gr and Gb signals supplied from the gamma-correction circuit 16A by the luminance signal generator 16B and chrominance matrix circuit 16C, respectively.

The compression/conversion processor 17 compresses the luminance signal Y and chrominance signals Cr and Cb from the captured image signal processor 16 for write into a memory and converts the same signals for provision as a video signal.

In the solid-state color imaging apparatus 10, for a monitoring image (through image) used for monitoring an image being captured and still image during the capture, the luminance signal generator 16B of the captured image signal processor 16 produces the luminance signal Y for the RG line is produced from the R and Gr signals and the luminance signal Y for the GB line from the B and Gr signals. The monitoring image signal is provided as an NTSC signal output, for example, from the compression/conversion processor 17.

Since there is generally a sensitivity difference from one photosensor S to another in the CCD 12, the sensitivity difference between the photosensors S will cause an amplitude difference between the Gr signal obtainable from the Gr pixel in the RG line and the Gb signal obtainable from the Gb pixel in the GB line. Therefore, an amplitude difference caused by the sensitivity difference from one photosensor S to another of the CCD 12 will exist between the luminance signal Y for the RG line produced from the R and Gr signals and the luminance signal Y for the GB line produced from the B and Gr signals. The sensitivity difference will possibly appear as a horizontal stripe-like noise in the monitoring image and captured image. In this solid-state color imaging apparatus 10, however, the values R_amp, B_amp, Gr_amp and Gb_amp of the gains Rgain, Bgain, Grgain and Gbgain of the four-channel amplifiers 152r, 152b, 152gr and 152gb can be controlled by the white balance processor 15 to make the Gr' and Gb' signals coincide in level with each other and reduce the horizontal stripe-like noise in the monitoring image and captured image.

Figure 6:
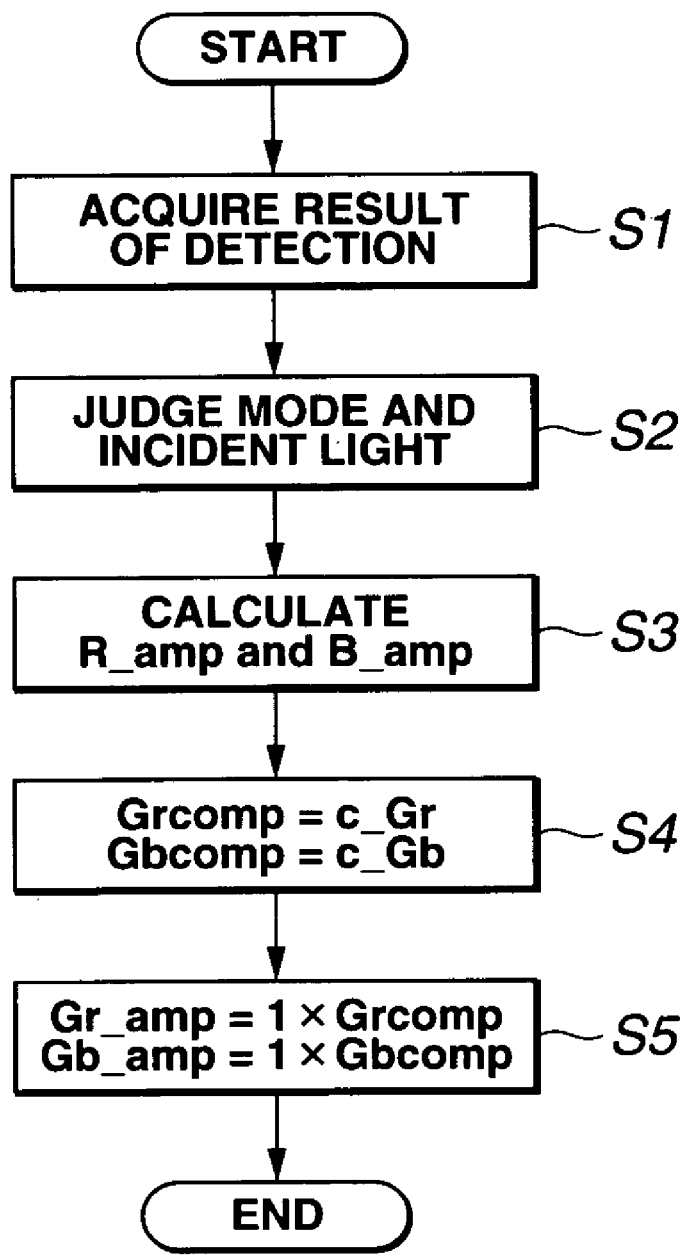
FIG. 6 is a flow chart of operations effected in one manner of gain setting by the arithmetic circuit incorporated in the white balance processor.

In the solid-state color imaging apparatus 10, to eliminate the amplitude difference between the luminance signal Y for the RG line produced from the R and Gr signal and the luminance signal Y for the GB line produced from the B and Gr signals, the values Gr_amp and Gb_amp of the gains Grgain and Gbgain, respectively, of the variable-gain amplifier 152gr for the Gr signal in the white balance processor 15 and the variable-gain amplifier 152gb for the Gb signal, respectively, are set by the arithmetic circuit 154 following the procedure shown in FIG. 6 for example.

In the gain setting procedure shown in the flow chart of FIG. 6, compensation factors for the gains Grgain and Gbgain are set to be fixed values in order to eliminate the amplitude difference between the Gr and Gb signals. The amplitude difference between the Gr and Gb signals is pre-calculated in the gain setting procedure, and compensation factors for the gains Grgain and Gbgain, with which no amplitude difference will exist between the Gr and Gb signal after subjected to the while balance processing, are set as fixed values and the gains Grgain and Gbgain are compensated with the factors.

More particularly, the arithmetic circuit 154 of the while balance processor 15 acquires an output from the WB detector 153 at step S1, and judges the mode and incident light at step S2.

Then at step S3, the arithmetic circuit 154 determines, according to the results of mode judgment and incident light judgment effected at step S2, values R_amp and B_amp of the gains Rgain and Bgain of the variable-gain amplifiers 152r and 152b of the WB amplifier 152.

Further at step S4, the arithmetic circuit 154 calculates a difference in amplitude between the Gr and Gb signals in advance, and takes as compensation factors Grcomp and Gbcomp fixed values c_Gr and c_Gb having been set so that the levels Gr' and Gb' of the white balance-processed Gr and Gb signals provided from the variable-gain amplifiers 152gr and 152gb of the WB amplifier 152, namely, amplitudes thereof, will be equal to each other.

Moreover at step S5, the arithmetic circuit 154 takes as the values Gr_amp and Gb_amp the values (×1 for example), respectively, normally used as the values Gr_amp and Gb_amp of the gains Grgain and Gbgain of the variable-gain amplifiers 152gr and 152gb of the WB amplifier 152, which are multiplied by the compensation factors Grcomp and Gbcomp, respectively.

The gain setting procedure in the flow chart shown in FIG. 6 can advantageously be effected with only a very little modification for the common white balance control, and thus the modification can be done very easily. In this gain setting procedure, however, the amplitude difference has to be pre-calculated for determination of compensation factors, and if there is a large variation from one CCD to another and the pre-calculated amplitude difference differs from an presumed one, it is not possible to compensate the amplitude difference between the Gr and Gb signals after subjected to the while balance processing. If there is a large variation between the Gr and Gb signals depending upon the status of an object to be imaged, there is a likelihood that the variation cannot be compensated. However, since the gain setting procedure can easily be modified for the common white balance control when it is known that the variation from one CCD to another is small or when the difference between the Gr and Gb signals is small depending upon the object to be imaged, it can be said to be a very effective procedure.

Figure 7:
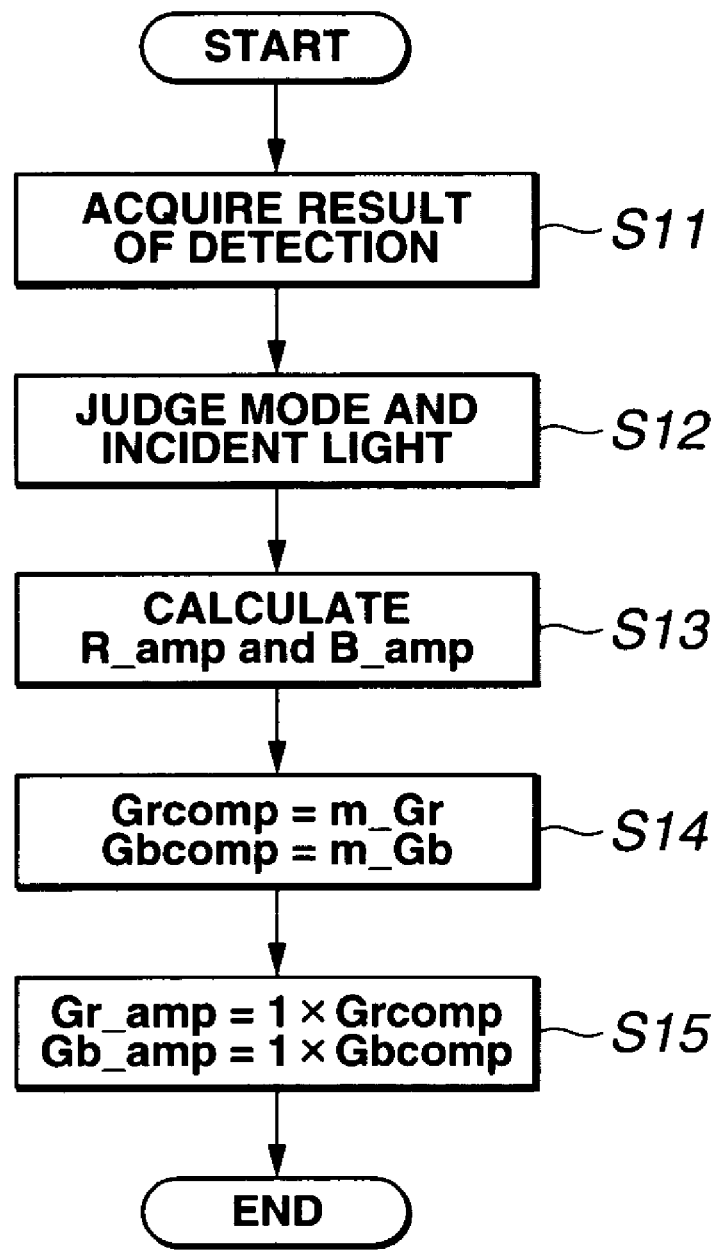
FIG. 7 is a flow chart of operations effected in another manner of gain setting by the processing circuit incorporated in the white balance processor.

Also, for elimination of the amplitude difference between the luminance signal Y for the RG line formed from the R and Gr signals and the luminance signal Y for the GB line formed from the B and Gr signals, the solid-state color imaging apparatus 10 according to the present invention may be adapted to set by the arithmetic circuit 154 the values Gr_amp and Gb_amp of the gains Grgain and Gbgain, respectively, of the variable-gain amplifier 152gr for the Gr signal and variable-gain amplifier 152gb for the Gb signal, both in the white balance processor 15 following the gain setting procedure in the flow chart shown in FIG. 7.

To eliminate the amplitude difference between the Gr and Gb signals, the gain setting procedure shown in the flow chart of FIG. 7 is designed to calculate the compensation factors for the gains Grgain and Gbgain for accommodation of even CCDs varying largely from each other. In this gain setting procedure, compensation factors for the gains Grgain and Gbgain, with which there will exist no amplitude difference between the Gr and Gb signals, are pre-calculated for each solid-state color imaging apparatus during manufacture, and are written into a memory such as an EEPROM or the like. The compensation factors for the gains Grgain and Gbgain, with which the white balance-processed Gr and Gb signals are equal in level to each other, are recalled from the memory and set for compensation of the gains.

In the gain setting procedure, the arithmetic circuit 154 of the white balance processor 15 acquire the output from the WB detector 153 at step 111, and judges the mode and incident light at step S12.

Then at step S13, the arithmetic circuit 154 determines, according to the results of mode judgment and incident light judgment effected at step S12, values R_amp and B_amp of the gains Rgain and Bgain of the variable-gain amplifiers 152r and 152b of the WB amplifier 152.

Further at step S14, the arithmetic circuit 154 calculates a difference in amplitude between the Gr and Gb signals in advance during manufacture of this solid-state color imaging apparatus 10 (digital camera) and takes as compensation factors Grcomp and Gbcomp values m_Gr and m_Gb having been calculated so that the levels Gr' and Gb' of the white balance-processed Gr and Gb signals provided from the variable-gain amplifiers 152gr and 152gb of the WB amplifier 152, namely, amplitudes thereof, will be equal to each other, and having been taken into the memory.

Moreover at step S15, the arithmetic circuit 154 takes as the values Gr_amp and Gb_amp the values (×1 for example), respectively, normally used as the values Gr_amp and Gb_amp of the gains Grgain and Gbgain of the variable-gain amplifiers 152gr and 152gb of the WB amplifier 152, which are multiplied by the compensation factors Grcomp and Gbcomp, respectively.

Figure 8:
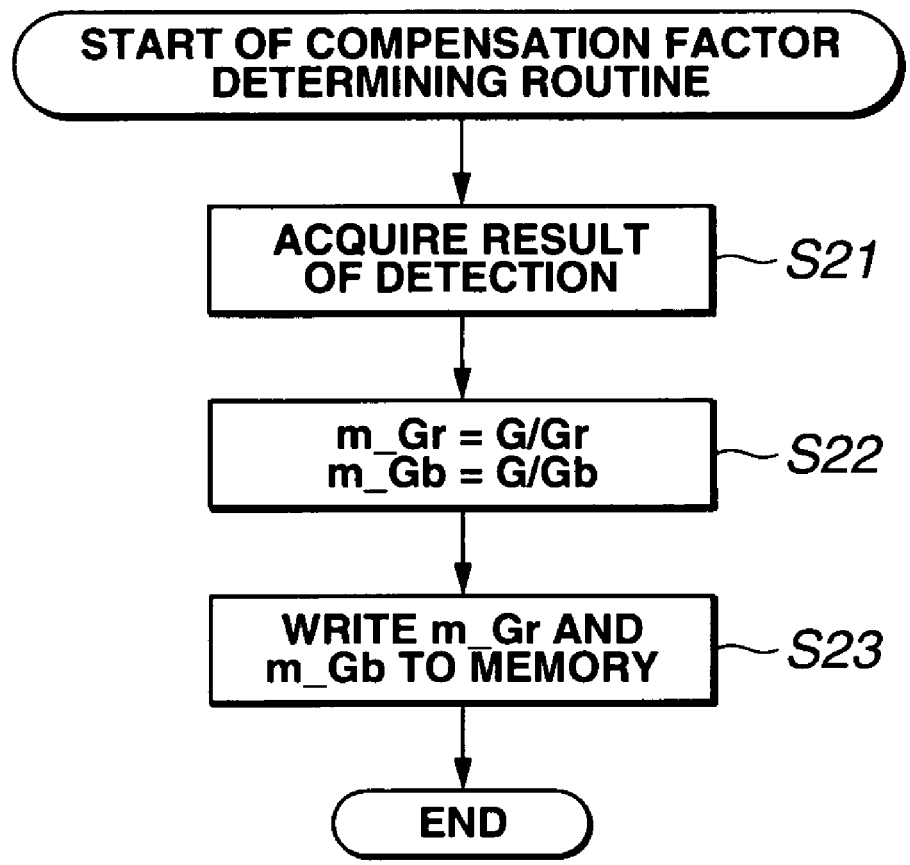
FIG. 8 is a flow chart of operations effected in a compensation factor calculation routine effected in advance in the another manner of gain setting by the arithmetic circuit.

FIG. 8 shows a Grgain/Gbgain compensation factor calculation routine effected for each of the digital cameras during manufacture.

That is, to execute the compensation factor calculation routine shown in FIG. 8, the arithmetic circuit 154 acquires at S21 the result of detection from the WB detector 153 after an object is imaged, and determines at step S22 the values m_Gr and m_Gb of the compensation factors Grcomp and Gbcomp for the gains Grgain and Gbgain of the variable-gain amplifiers 152gr and 152gb of the WB amplifier 152, respectively, so that the levels Gr' and Gb', namely, amplitudes, of the white balance-processed Gr and Gb signals provided from the variable-gain amplifiers 152gr and 152gb of the WB amplifier 152 are G (mean value of the levels Gr and Gb of the Gr and Gb signals before subjected to the white balance processing).

Then at step S23 the arithmetic circuit 154 writes to the memory the values m_Gr and m_Gb of the compensation factors Grcomp and Gbcomp having been determined at step S22 so that they can be used any time in the common routine shown in FIG. 7.

The gain setting procedure shown in the flow chart in FIG. 7 can advantageously absorb a variation from one CCD to another by acquiring data on each of the digital cameras during manufacture and writing the values m_Gr and m_Gb of the compensation factors Grcomp and Gbcomp when the variation is so large that the amount of compensation cannot be fixed. When the difference between the Gr and Gb signals varies largely depending upon the status of the object, however, the gain setting procedure in FIG. 7 cannot completely compensate the variation. However, when the difference between the Gr and Gb signals is small depending upon the status of the object, it suffices to calculate compensation factors only once during manufacture of the digital cameras without any modification of the common routine. Also, the gain setting procedure in FIG. 7 can easily be modified. Thus, this procedure can be said to be an effective one.

Figure 9:
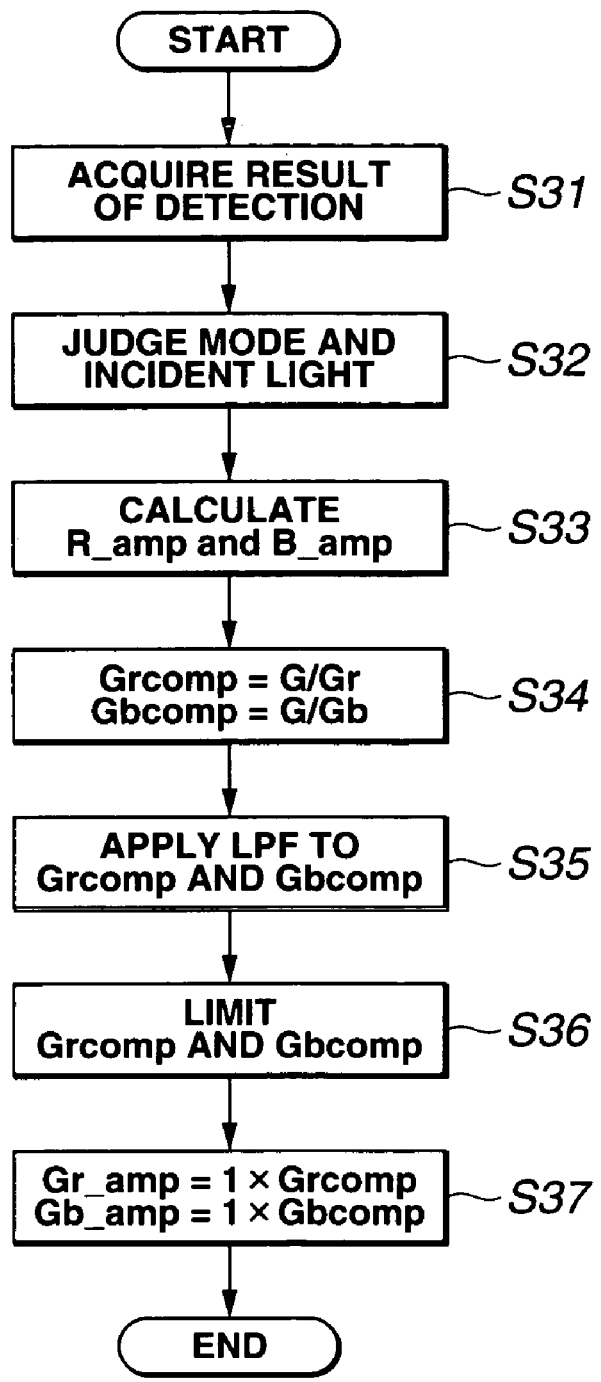
FIG. 9 is a flow chart of operations effected in a still another manner of gain setting by the arithmetic circuit.

Also, to eliminate the difference in amplitude between the luminance signal Y for the RG line formed from the R and Gr signals and the luminance signal Y for the GB line formed from the B and Gr signals, the solid-state color imaging apparatus 10 may be adapted to set the values Gr_amp and Gb_ap of the gains Grgain and Gbgain of the variable-gain amplifier 152gr for the Gr signal and the variable-gain amplifiers 152gb for the Gb signal, respectively, of the white balance processor 15 by the arithmetic circuit 154 following the gain setting procedure in the flow chart shown in FIG. 9 for example.

In the gain setting procedure in the flow chart shown in FIG. 9, the arithmetic circuit 154 calculates an amplitude difference between Gr and Gb signals from the output from the WB detector 153 to determine compensation factors for the gains Grgain and Gbgain, respectively, in order to eliminate the amplitude difference between the Gr and Gb signals. Thus, this gain setting procedure permits to positively compensate any amplitude difference.

That is, the arithmetic circuit 154 of the white balance processor 15 acquires first at step S31 the output from the WB detector 153, and then judges the mode and incident light at step S32.

Then the arithmetic circuit 154 writes at step S23 to the memory the values m_Gr and m_Gb of the compensation factors Grcomp and Gbcomp having been determined at step S32 so that they can be used at any time in the common routine shown in FIG. 7.

Next at step S34, the arithmetic circuit 154 determines the compensation factors Grcomp and Gbcomp for the gains Grgain and Gbgain of the variable-gain amplifiers 152gr and 152gb of the WB amplifier 152 so that the levels Gr' and Gb', namely, amplitudes, of the signals Gr and Gb provided from the variable-gain amplifiers 152gr and 152gb of the WB amplifier 152 are G (mean value of the levels Gr and Gb of the signals Gr and Gb signals before subjected to the white balance processing).

At step S35, the arithmetic circuit 154 applies LPF (low pass filtering) to the compensation factors Grcomp and Gbcomp calculated at step S34. Thus, the influence on the compensation factors Grcomp and Gbcomp of a fluctuation of the result of the detection of the Gr and Gb signals by the WB detector 153 is reduced.

Further at step S36, the arithmetic circuit 154 limits the compensation factors Grcomp and Gbcomp having been subjected to LPF at step S35 so that the gains Grgain and Gbgain of the variable-gain amplifiers 152gr and 152gb of the WB amplifier 152 will not take any values Gr_amp and Gb_amp which are not expected.

At step S37, the arithmetic circuit 154 takes as Gr_amp and Gb_amp the values (×1 for example), respectively, normally used as the values Gr_amp and Gb_amp of the gains Grgain and Gbgain of the variable-gain amplifiers 152gr and 152gb of the WB amplifier 152, which are multiplied by the compensation factors Grcomp and Gbcomp.

The gain setting procedure in the flow chart shown in FIG. 9 may not be varied so much from the common gain setting procedure for the white balance control and can advantageously be effected with no problem also when the variation from one CCD to another is large or when the amplitude difference between the Gr and Gb signals varies depending upon the status of the object.

In the foregoing, the present invention has been described concerning three kinds of gain setting procedures in which the values Gr_amp and Gb_amp of the gains Grgain and Gbgain of the variable-gain amplifier 152gr for the Gr signal and variable-gain amplifier 152gb for the Gb signal, respectively, of the white balance processor 15 are set by the arithmetic circuit 154 to eliminate the amplitude difference between the luminance signal Y for the RG line formed from the R and Gr signals and the luminance signal Y for the GB line formed from the B and Gr signals. In addition, any of the procedures with only a little modification/addition of the program in the CPU in the arithmetic circuit 154 permits to reduce the horizontal stripe-like noise in the monitoring image and noise in the still image during image capturing. All these methods are advantageous since the conventional system has not to be modified and thus no costs are taken.

What is claimed is:

1. A color imaging apparatus comprising:
    a solid-state image sensor having photosensors color-coded with three primary color filters formed like a matrix correspondingly to pixels of the solid-state image sensor, to provide three primary color signals acquired as captured image signals;
    a four-channel signal detecting means for detecting, from the three primary color signals provided from the solid-state image sensor, an R signal acquired from R pixels in a horizontal line of R, G, R, G, . . . , R and G color filters, a Gr signal acquired from the G pixels in the same horizontal line, a Gb signal acquired from G pixels in a horizontal line of G, B, G, B, . . . , G and B color filters, and a B signal acquired from the B pixels in the same horizontal line;
    a four-channel variable-gain amplifying means whose channels are controllable in gain independently of one another to amplify the R, Gr, Gb and B signals,
    wherein said R, Gr, Gb and B signals are amplified to substantially the same levels as one another, and wherein both luminance and chrominance signals are generated using the amplified four signals; and
    a gain controlling means for controlling, based on an output from the signal detecting means, the gains of R and B channels of the variable-gain amplifying means so that the R and B signals amplified by the variable-gain amplifying means are equal in level for an achromatic color image, and said gain controlling means generating a mean value of the outputs of Gr and Gb channels of the variable-gain amplifying means so that the amplitude difference between the luminance signal for the horizontal line of R, G, R, G, . . . , R and G color filters produced from the R and Gr signal and the luminance signal for the horizontal line of G, B, G, B, . . . , G and B color filters produced from the B and Gb signal is substantially reduced.

2. The apparatus as set forth in claim 1, wherein the gain controlling means compensates, based on the output from the signal detecting means, the gains of the channels for the Gr and Gb signals with pre-calculated fixed compensation factors.

3. The apparatus as set forth in claim 1, wherein the gain controlling means detects, based on the output from the signal detecting means, an amplitude difference between the Gr and Gb signals, calculates compensation factors from the amplitude difference, and compensates the gains of the channels for the Gr and Gb signals with the compensation factors.

4. The apparatus as set forth in claim 1, wherein the solid-state image sensor is a CCD.

5. The apparatus as set forth in claim 1, wherein the captured image signal from the solid-state image sensor is extracted via a sample & hold circuit and AGC circuit, and then subjected to A/D conversion.

6. A color imaging method comprising the steps of:
    detecting, from the three primary color signals provided from the solid-state image sensor having photosensors color-coded with three primary color filters formed like a matrix correspondingly to pixels of the solid-state image sensor, an R signal acquired from R pixels in a horizontal line of R, G, R, G, . . . , R and G color filters, a Gr signal acquired from the G pixels in the same horizontal line, a Gb signal acquired from G pixels in a horizontal line of G, B, G, B, . . . , G and B color filters, and a B signal acquired from the B pixels in the same horizontal line;
    amplifying the R, Gr, Gb and B signals by a four-channel variable-gain amplifying means whose channels are controllable in gain independently of each other,
    wherein said R, Gr, Gb and B signals are amplified to substantially the same levels as one another, and wherein both luminance and chrominance signals are generated using the amplified four signals;
    controlling, by a gain controlling means, based on an output from the signal detecting means, the gains of R and B channels of the variable-gain amplifying means so that the R and B signals amplified by the variable-gain amplifying means are equal in level for an achromatic color image; and
    generating a mean value of the outputs of Gr and Gb channels of the variable-gain amplifying means so that the amplitude difference between the luminance signal for the horizontal line of R, G, R, G, . . . , R and G color filters produced from the R and Gr signal and the luminance signal for the horizontal line of G, B, G, B, . . . , G and B color filters produced from the B and Gb signal is substantially reduced.

7. The method as set forth in claim 6, wherein at the gain controlling step based on the output from the signal detecting means, the gains of the channels for the Gr and Gb signals are compensated with pre-calculated fixed compensation factors.

8. The method as set forth in claim 6, wherein at the gain controlling step, based on the output from the signal detecting means, an amplitude difference between the Gr and Gb signals is detected, compensation factors are calculated from the amplitude difference, and the gains of the channels for the Gr and Gb signals are compensated with the compensation factors.

9. The method as forth in claim 6, wherein the solid-state image sensor is a CCD.

10. The method as forth in claim 6, further comprising the step of extracting the captured image signal from the solid-state image sensor via a sample & hold circuit and AGC circuit, and then effecting A/D conversion of the captured image signal.

* * * * *